(12) United States Patent
Gerard et al.

(10) Patent No.: US 11,106,844 B2
(45) Date of Patent: Aug. 31, 2021

(54) METHOD FOR DETERMINING THE DIMENSIONS OF AN ELECTROCHEMICAL CELL COMPRISING PCB HOLDING PLATES

(71) Applicant: Commissariat a l'energie atomique et aux energies alternatives, Paris (FR)

(72) Inventors: Mathias Gerard, Grenoble (FR); Jean-Noel Carminati, Grenoble (FR); Laurent Garnier, Grenoble (FR); Ramon Naiff Da Fonseca, Grenoble (FR); Ludovic Rouillon, Grenoble (FR); Remi Vincent, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 163 days.

(21) Appl. No.: 16/385,525

(22) Filed: Apr. 16, 2019

(65) Prior Publication Data

US 2019/0318055 A1    Oct. 17, 2019

(30) Foreign Application Priority Data

Apr. 17, 2018 (FR) .................................... 18 53359

(51) Int. Cl.
*G06F 30/23* (2020.01)
*C25B 15/00* (2006.01)
(Continued)

(52) U.S. Cl.
CPC .............. *G06F 30/23* (2020.01); *C25B 15/00* (2013.01); *H01M 8/1004* (2013.01); *G06F 2111/10* (2020.01)

(58) Field of Classification Search
CPC ...... C25B 15/00; C06F 30/23; C06F 2111/10; H01M 8/1004
See application file for complete search history.

(56) References Cited

U.S. PATENT DOCUMENTS

| 7,341,800 | B2 * | 3/2008 | Sasahara | ............. | H01M 8/0271 |
| | | | | | 429/513 |
| 2004/0028989 | A1 * | 2/2004 | Sun | ..................... | H01M 4/9008 |
| | | | | | 429/431 |

(Continued)

FOREIGN PATENT DOCUMENTS

JP           2004-327105        11/2004

OTHER PUBLICATIONS

French Preliminary Search Report dated Mar. 20, 2019 in French Application 1853359, filed on Apr. 17, 2018 (with English translation of categories of Cited Documents and Written Opinion).

*Primary Examiner* — Carl J Arbes
(74) *Attorney, Agent, or Firm* — Oblon, McClelland, Maier & Neustadt, L.L.P.

(57) ABSTRACT

The invention relates to a method for determining the dimensions of an electrochemical cell allowing a total area of the electrochemical cell to be minimized while maximizing an electrical signal generated by the electrochemical cell in operation, including:
a/ determining a first cost function expressing the variation in a first parameter representative of the total area as a function of an adjustment variable representative of an aspect ratio of the active zone;
b/ determining a second cost function expressing the variation in a second parameter representative of the generated electrical signal as a function of the adjustment variable;
c/ determining a compound cost function from the first and second cost functions and identifying a value of the adjustment variable that optimizes the compound cost function and that therefore conjointly optimizes the first and second cost functions.

15 Claims, 4 Drawing Sheets

(51) Int. Cl.
*H01M 8/1004* (2016.01)
*G06F 111/10* (2020.01)

(56) References Cited

U.S. PATENT DOCUMENTS

| | | | |
|---|---|---|---|
| 2004/0191600 A1* | 9/2004 | Gyoten | H01M 8/1039 |
| | | | 429/465 |
| 2005/0181254 A1* | 8/2005 | Uensal | H01M 8/1048 |
| | | | 429/483 |
| 2010/0227236 A1 | 9/2010 | Mayorga Lopez et al. | |
| 2015/0140462 A1 | 5/2015 | Mayorga Lopez et al. | |

* cited by examiner

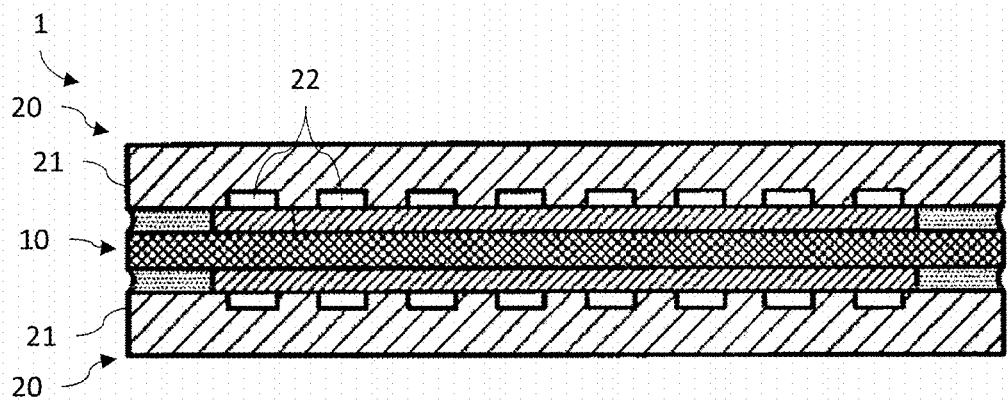
Fig.1A
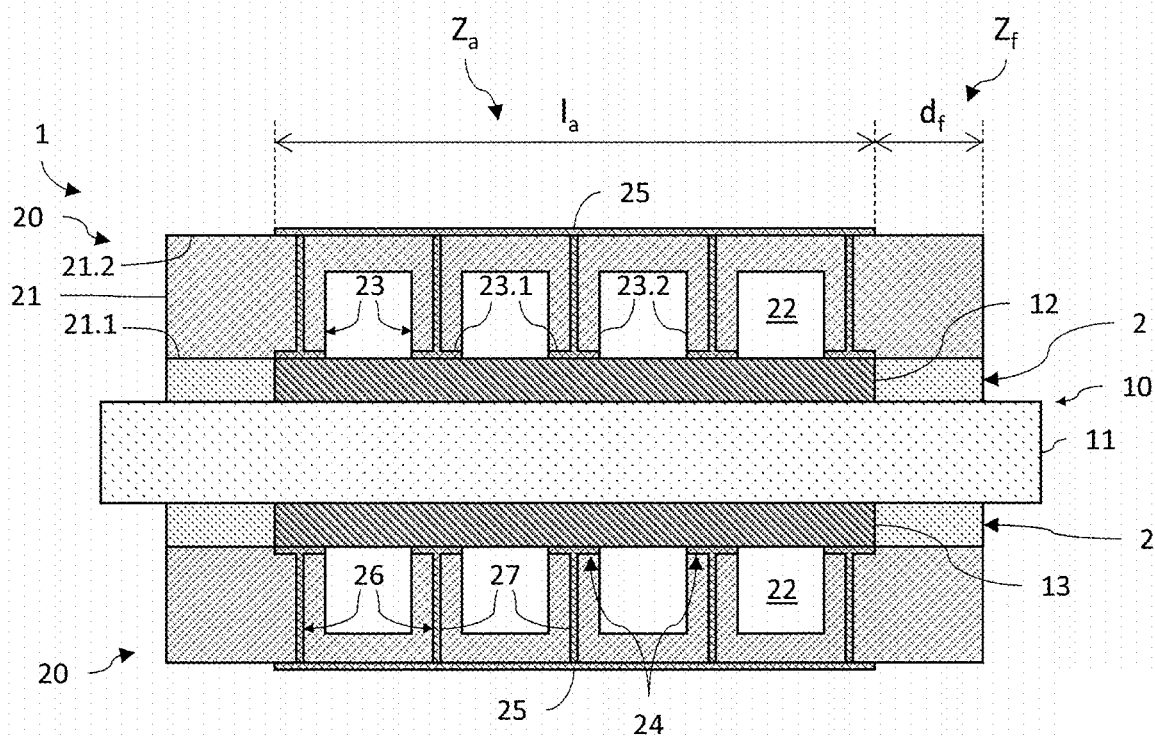
Fig.1B
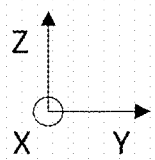

METHOD FOR DETERMINING THE DIMENSIONS OF AN ELECTROCHEMICAL CELL COMPRISING PCB HOLDING PLATES

TECHNICAL FIELD

The field of the invention is that of electrochemical generators, such as fuel-cell stacks and electrolysers, comprising at least one electrochemical cell the membrane electrode assembly of which is fastened, notably by adhesive bonding, to two holding plates, the latter possibly for example being printed circuit boards. The invention more particularly relates to a method for determining the dimensions of an electrochemical cell and to a process for manufacturing such an electrochemical cell.

PRIOR ART

An electrochemical generator, such as a fuel-cell stack or an electrolyser, conventionally comprises at least one electrochemical cell the anode and cathode of which are electrically separated from each other by an electrolytic membrane, the cell being the site of electrochemical reactions between continuously introduced reactants. The stack of the electrodes and of the electrolytic membrane is called a membrane electrode assembly (MEA).

An electrochemical cell conventionally comprises two holding plates, in contact with which is placed the membrane electrode assembly. The holding plates, which are called bipolar plates in the case of a stack of electrochemical cells, are suitable for fluidically distributing reactants to the electrodes and for electrically connecting the latter.

These holding plates may be produced in PCB (printed circuit board) technology. Thus, as illustrated in FIG. 1A, document US 2004/0224190 describes PCB holding plates 20 for an electrochemical cell 1. Each holding plate 20 comprises an insulating substrate 21, made from an electrically insulating material, an internal face of which comprises structures forming fluidic distribution channels 22. Electrically conductive strips are placed on the internal face, extend along longitudinal walls that separate the distribution channels 22 pairwise, and make contact with the membrane electrode assembly 10 in order to allow the electrodes to be electrically biased.

In operation, the absolute pressure in the distribution channels, in particular cathode-side, may be of the order of 1 bar to a few bars in the case of a fuel-cell stack, and of the order of several tens of bars in the case of an electrolyser. To avoid having to make recourse to compressive end plates, document US 2004/0224190 makes provision to use a fibre-reinforced adhesive, this making it possible to keep the holding plates assembled with each other on either side of the membrane electrode assembly.

However, there is a need to improve the characteristics or electrochemical performance of such an electrochemical cell in operation.

SUMMARY OF THE INVENTION

The objective of the invention is to at least partially remedy the drawbacks of the prior art, and more particularly to provide a method for determining the dimensions of an electrochemical cell comprising holding plates, for example PCB holding plates, allowing a total area of the electrochemical cell to be minimized while maximizing an electrical signal generated by the electrochemical cell. An electrochemical cell produced with such dimensions is then able to deliver a good electrochemical performance for a better energy density per unit mass.

To this end, one subject of the invention is a method for determining the dimensions of an electrochemical cell, which method is implemented by a computer and allows a total area of the electrochemical cell to be minimized while maximizing an electrical signal generated by the electrochemical cell in operation, the electrochemical cell comprising:

a membrane electrode assembly formed from two electrodes separated from each other by an electrolytic membrane, and two holding plates between which the membrane electrode assembly is in contact;

the total area of the electrochemical cell being defined in a plane parallel to the plane of the electrolytic membrane by:

an active zone of elongate shape having an aspect ratio defined by a length and a width, the length being larger than the width, in which zone each holding plate is liable to be deformed in a direction opposite to the plane of the electrolytic membrane, and by a fastening zone encircling the active zone, in which zone each holding plate is fastened to the membrane electrode assembly.

The method according to the invention comprises at least the following steps:

a. determining a first cost function expressing the variation in a first parameter representative of the total area as a function of an adjustment variable representative of said aspect ratio of the active zone;

b. determining, from a predetermined physical model of the electrochemical cell implemented in the computer, a second cost function expressing the variation in a second parameter representative of the generated electrical signal as a function of the adjustment variable;

c. determining a so-called compound cost function from the first and second cost functions and identifying a value of the adjustment variable that optimizes the compound cost function and that therefore conjointly optimizes the first and second cost functions.

The following are certain preferred but nonlimiting aspects of this method.

The predetermined physical model may furnish a variation, under given operating conditions, i.e. under predefined operating conditions, in said generated electrical signal as a function of an electrical resistance the value of which depends on a local deformation of a holding plate in the active zone, said local deformation itself being dependent on the adjustment variable.

The method may comprise:

implementing steps a to c several times so that, in each implementation, the physical model furnishes a different variation in said generated electrical signal, said variations in said generated electrical signal corresponding to various operating conditions of the electrochemical cell in operation, a plurality of optimal values of the adjustment variable thus being identified;

a step d of selecting one of said identified optimal values depending on a predetermined target value for the total area and/or on a predetermined target value for the generated electrical signal.

During said reiterations of steps a to c, said variations in said generated electrical signal may correspond to a given value of an electrical signal imposed on the electrochemical cell in operation.

Preferably, the first parameter, the second parameter and the adjustment variable are normalized.

Preferably, the first cost function tends to be optimized when the adjustment variable tends to 1 or 0, respectively, and the second cost function tends to be optimized when the adjustment variable tends to 0 or 1, respectively.

Preferably, the first parameter is chosen so that the first cost function is decreasing or increasing function, respectively, and the second parameter is chosen so that the second cost function is an increasing or decreasing function, respectively.

Preferably, the first parameter is chosen so that the minimization or maximization, respectively, of the first cost function tends to minimize the total area, and the second parameter is chosen so that the minimization or maximization, respectively, of the second cost function tends to maximize the electrical signal.

Preferably, the compound cost function is a norm of a vector formed, for each value of the adjustment variable, from the corresponding values of the first parameter and of the second parameter, the identified value of the adjustment variable corresponding to an extremum of the compound cost function.

Preferably, the compound cost function is a possibly linear combination of the first cost function and the second cost function, the identified value of the adjustment variable corresponding to an extremum of the compound cost function.

The invention also relates to a process for manufacturing an electrochemical cell, comprising the following steps:
determining the dimensions of an electrochemical cell using the method according to any one of the preceding features;
manufacturing the electrochemical cell so that the aspect ratio of the active zone is a function of the identified value of the adjustment variable.

Preferably, the aspect ratio of the active zone is chosen in a range of the adjustment variable for which the compound cost function has a deviation smaller than or equal to a predetermined percentage from the extremum corresponding to the identified value of the adjustment variable.

The invention also relates to a computer program and to a data storage medium comprising instructions for executing the determining method according to any one of the preceding features, these instructions being able to be executed by a computer.

The invention also relates to a device for determining the dimensions of an electrochemical cell comprising:
a computer, comprising a processor and a memory, configured to implement the determining method according to any one of the preceding features;
means for inputting data in order to furnish the computer with a value for the area of the active zone and a value for the dimension of the fastening zone;
means for outputting at least one identified value of the adjustment variable.

BRIEF DESCRIPTION OF THE DRAWINGS

Other aspects, aims, advantages and features of the invention will become more clearly apparent on reading the following detailed description of preferred embodiments thereof, which description is given by way of nonlimiting example with reference to the appended drawings, in which:

FIG. 1A, which has already been described, is a schematic cross-sectional view of an electrochemical cell comprising PCB holding plates according to one example of the prior art; FIG. 1B is a schematic cross-sectional view of an electrochemical cell comprising PCB holding plates according to one embodiment;

DETAILED DESCRIPTION OF PARTICULAR EMBODIMENTS

Figure 2A:
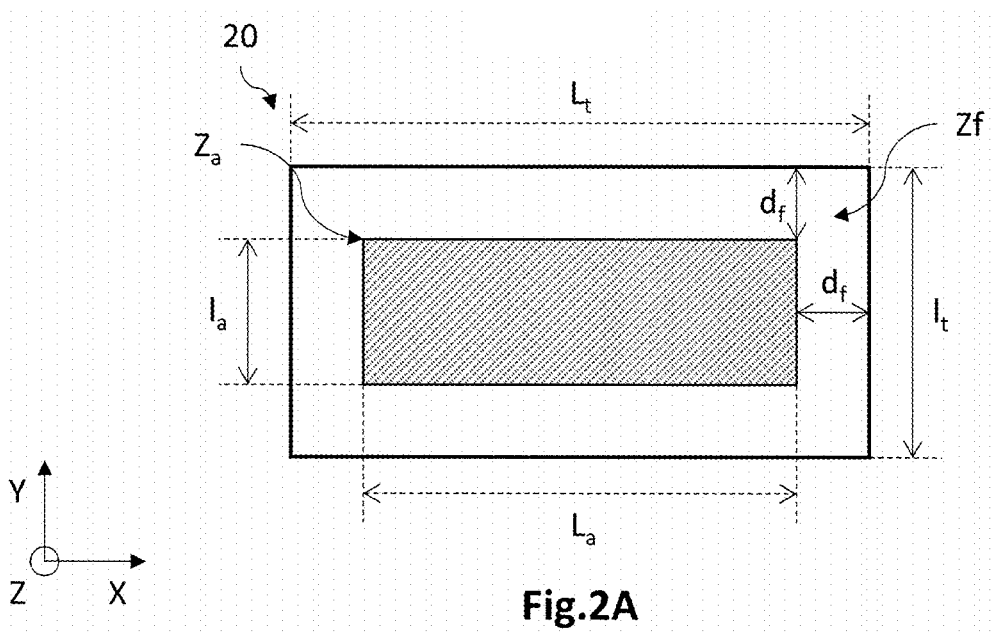
FIG. 2A is a schematic top view of a holding plate illustrating the active zone Za encircled by the peripheral fastening zone Zf.

In the figures and in the rest of the description, the same references have been used to refer to elements that are identical or similar. In addition, the various elements are not shown to scale for the sake of clarity of the figures. Moreover, the various embodiments and variants are not exclusive from one another and may be combined together. Unless otherwise indicated, the terms "substantially", "about", and "of the order of" mean to within 10%.

The invention relates to a method for determining the dimensions of an electrochemical cell comprising holding plates fastened to the membrane electrode assembly, in particular by adhesive bonding. This determining method is implemented by a computer (which comprises a processor and a memory) configured to implement said determining method. The holding plates may be, for example, PCB (printed circuit board) holding plates. The method allows both the total area of the electrochemical cell and the electrical signal generated by said electrochemical cell in operation, and therefore the delivered electrical power, to be optimized.

Various embodiments and variants will be described with reference to a fuel-cell stack, and in particular a PEM (proton exchange membrane) fuel-cell stack the cathode of which is supplied with oxygen and the anode with hydrogen. The invention however applies to any fuel-cell stack, in particular fuel-cell stacks operating at low temperature, i.e. a temperature below 200° C., and to low-temperature electrochemical electrolysers, for example electrolysers that generate hydrogen and oxygen from water.

FIG. 1B is a schematic and partial cross-sectional view of an electrochemical cell 1 according to one embodiment, comprising PCB holding plates 20. However, holding plates in other technologies may be used, such as, for example, stamped metal sheets, or plates made of a graphite-filled composite and produced by moulding.

An orthogonal three-dimensional direct coordinate system (X, Y, Z), in which the X- and Y-axes form a plane parallel to the main plane of the electrochemical cell 1, and in which the Z-axis is oriented in the direction of the thickness of the cell is defined here and for the rest of description.

The electrochemical cell 1 comprises a membrane electrode assembly 10 formed from an anode 12 and a cathode 13 that are separated from each other by an electrolytic membrane 11. The membrane electrode assembly 10 is placed between holding plates 20 that are suitable for bringing reactive species to the electrodes 12, 13 and for electrically connecting the latter. They are also suitable for removing the heat produced during the electrochemical reaction.

Each electrode 12, 13 comprises a gas diffusion layer (GDL) and an active layer located between the electrolytic membrane 11 and the diffusion layer. The active layers are the site of the electrochemical reactions. They comprise materials allowing oxidation and reduction reactions at the respective interfaces of the anode 12 and the cathode 13 with the electrolytic membrane 11. The diffusion layers are made of a porous material that permits the diffusion of the reactive species between the distribution circuits 22 of the holding plates 20 and the active layers, and the diffusion of the products generated by the electrochemical reaction.

The electrolytic membrane 11 is here a proton exchange membrane. It allows protons to diffuse from an anode 12 to a cathode 13, the anode 12 and the cathode 13 facing each other, the protons possibly taking the form, within the membrane, of $H_3O^+$ ions. It also electrically insulates the anode 12 and cathode 13 from each other.

Each holding plate 20 is a PCB (printed circuit board), i.e. it comprises an insulating substrate 21 made from an electrically insulating material, on and through which electrical connection elements extend. It has an internal face 21.1 comprising fluidic distribution channels 22 that are separated pairwise by longitudinal walls 23, the latter making contact with one of said electrodes and being suitable for applying an electrical potential thereto.

The insulating substrate 21 is a rigid, or optionally flexible, substrate made from an electrically insulating material. It has an internal face 21.1 and an external face 21.2 that lie opposite each other. The internal face 21.1 is oriented toward the membrane electrode assembly 10 and makes electrical contact with one of the electrodes 12, 13. The insulating substrate 21 has a maximum thickness that may be about a few millimetres, for example comprised between 1 mm and 6 mm, and preferably equal to 2 mm. The insulating material is furthermore inactive with respect to an aqueous medium, i.e. inactive with respect to moisture. It may thus be a question of a PF4 material, i.e. of a fibreglass-reinforced epoxy resin.

Fluidic distribution circuits are formed by structuring the internal faces 21.1 of the holding plates 20. This structuring of the internal face 21.1 defines fluidic distribution channels 22 that are suitable for bringing and removing fluids to and from the electrodes. These distribution channels 22 take the form of grooves produced in the insulating substrate 21 from the internal face 21.1. The distribution channels 22 are separated pairwise by a longitudinal wall 23. The longitudinal walls 23 are bounded by opposite lateral faces 23.2 and by an end face 23.1. The longitudinal walls 23 make contact with the membrane electrode assembly 10 via their end faces 23.1.

Conductive contact segments 24 are placed on the end faces 23.1 of the longitudinal walls 23. These conductive contact segments 24 are made from electrically conductive material, and are suitable for electrically connecting the electrode to an external electrical circuit. The conductive contact segments 24 thus make electrical contact with the corresponding electrode. In this example, the end faces 23.1 are at least partially coated by the conductive contact segments 24, and the lateral faces 23.2 that bound the distribution channels 22 transversely are substantially not coated with the conductive contact segments 24. The conductive contact segments 24 extending over the end face 23.1 of a given longitudinal wall 23 may join one another and form a continuous conductive strip, or be separate from one another and form separate conductive pads. The conductive contact segments 24 may have a thickness of about a few tens to a few hundred microns, for example comprised between 10 µm and 500 µm, and preferably equal to 70 µm. They may be made from a material chosen from copper, gold, nickel gold, chromium, tungsten titanium or any other suitable electrically conductive material.

At least one biasing conductive track 25 extends over the external face 21.2 of the insulating substrate 24. It is electrically connected to the conductive contact segments 24, and ensures the connection thereof to the external electrical circuit of the electrochemical generator. The biasing conductive track 25 may have a thickness of the order of a few tens to a few hundred microns, for example comprised between 10 µm and 500 µm, and preferably equal to 70 µm. They may be made from a material chosen from copper, gold, nickel gold, chromium, tungsten titanium, or any other suitable electrically conductive material.

The insulating substrate 21 comprises through-orifices 26 that extend from the external face 21.2 to the internal face 21.1, and more precisely to the end faces 23.1 of the longitudinal walls 23, along the Z-axis. The through-orifices 26 thus extend through the longitudinal walls 23 and open onto the end faces 23.1. They comprise electrical connectors 27, taking the form of an electrically conductive material, that connect the biasing conductive track 25 to the conductive contact segments 24. The through-orifices 26 associated with the electrical connectors 27 thus form conductive vias. The through-orifices 26 may have a diameter of the order of a few tens to a few hundred microns, and for example comprised between 50 µm and 500 µm. They preferably take the form of holes rather than taking the form of trenches, in the sense that the transverse dimensions in the XY-plane are of the same order of magnitude. The electrical connectors 27 may have a thickness, in the XY-plane, of the order of a few tens to a few hundred microns, for example comprised between 10 µm and 100 µm, and preferably equal to 70 µm. They may be made from a material chosen from copper, gold, nickel gold, chromium, tungsten titanium, or any other suitable electrically conductive material. The through-orifices 26 are preferably seal-tightly plugged, in particular by the electrical connectors 27.

The electrochemical generator comprises an external electrical circuit (not shown) that electrically connects the biasing conductive tracks 25 to an electrical load when the generator is a fuel-cell stack, or to a voltage source when the generator is an electrolyser. The electric load is suitable for imposing an electrical-current value on the electrochemical cell 1, which in response applies a voltage U across the terminals of the electrical load. The voltage generated by the electrochemical cell 1 may be of the order of 0.7 V. In the case of an electrolyser, the voltage source is electrically connected to the electrodes of the electrochemical cell 1, and is suitable for applying a DC potential difference between the anode 12 and the cathode 13. The applied voltage is positive, in the sense that the electrical potential imposed on the anode 12 is higher than that imposed on the cathode 13. It may be comprised between 1.3 V and 3 V, and for example be equal to about 1.8 V, for a current density comprised between about 50 mA/cm$^2$ and 4 A/cm$^2$. The application of the voltage thus allows water to be oxidized at the anode 12, electrons to flow through the electrical circuit to the cathode 13, and protons to be reduced at the cathode 13.

Thus, the conductive contact segments 24 are directly connected to the biasing conductive track 25 by the conductive vias 27 located in the longitudinal walls 23, and not by remote conductive vias located outside of the active zone Za of the membrane electrode assembly 10. Positioning the conductive vias 27 in this way in the longitudinal walls 23 allows a better spatial uniformity of the electrical properties of the holding plate 20 to be ensured in the sense that each conductive contact segment 24 is connected in the same way to the biasing conductive track 25. The electrical access resistance of the conductive contact segments 24 is thus substantially uniform.

In addition, it is possible to produce the conductive contact segments 24 in the form of pads that are separate from one another, each pad 24 being connected to one biasing conductive track 25 by one conductive via 27. Thus, the conductive contact segments 24 of a given longitudinal wall 23 no longer form a continuous strip, but rather pads that are separate from one another. This makes it possible to ensure a better mechanical contact, and a better penetration of the conductive contact pads 24 into the corresponding electrode, thus decreasing electrical contact resistance Rc. The electrical performance of the electrochemical cell 1 is thus improved.

The electrochemical cell 1 has a total area $S_t$ in an XY-plane parallel to the plane of the electrolytic membrane 11. This total area $S_t$ is defined by a so-called active zone Za and by a so-called fastening zone Zf.

The active zone Za lies in an XY-plane parallel to the plane of the electrolytic membrane 11, in which the membrane electrode assembly 10 is located, and more precisely in which the electrodes 12, 13 of the MEA are located. It is thus a question of the zone in which the electrochemical reactions take place.

It has an elongate shape in the XY plane and an area $S_a$ of length $L_a$ and of width $l_a$. By elongate shape, what is meant is a shape defined by the longitudinal dimension (length) $L_a$ and a transverse dimension (width) $l_a$, the length $L_a$ being larger than the width $l_a$. The elongate shape may be rectangular, oblong, oval, inter alia. Preferably, the elongate shape is rectangular, as illustrated in FIG. 2A, i.e. it forms a quadrilateral the sides of which are parallel pairwise, the corners possibly being right or rounded. The elongate shape is characterized by an adimensional parameter $\tilde{R}_f$ representative of the aspect ratio of the active zone Za, here equal to $S_a/L_a^2$. Other equivalent adimensional parameters may be used, for example $L_a/l_a$. The shape of the active zone Za may here tend toward a square shape ($L_a \sim l_a$) or a very elongate shape ($L_a \gg l_a$).

The area $S_a$ may be predetermined so that the electrochemical cell 1 furnishes a desired electrical power, the latter being to be optimized for an electrical current density imposed on the cell when it is operating in imposed-current regime, and for a voltage to be optimized.

In the active zone Za, the holding plates 20 make contact with the electrodes 12, 13 without being fastened to the latter. Furthermore, in operation, a pressure is applied to the distribution channels 22. By way of example, the pressure may be of the order of 1 bar on the anode-side and of a few tens of bars on the cathode-side in the case of an electrolyser, or of one to several bars in the case of a fuel-cell stack. Thus, the holding plates 20 are liable to undergo a deformation away from the MEA 10 in a Z-direction orthogonal thereto, which may result in a local modification of the electrical contact resistance Rc. The electrical contact resistance Rc is one of the contributors to the electrical resistance $R_{cell}$ of the electrochemical cell. The latter notably depends on the sum of the electrical resistances of the various elements of the cell (electrical connectors $R_{ce}$, membrane $R_m$, electrodes $R_{GDL}$) and on the contact resistance Rc between each holding plate 20 and the electrode 12, 13 with which it makes contact. The contact resistance Rc notably depends on the quality of the mechanical contact between the holding plate 20 and the membrane electrode assembly 10. Thus, depending on the pressure of the fluid flowing through the distribution channels 22, the associated contact resistance Rc at the interface between a holding plate 20 and an electrode 12, 13 may exhibit a variation in its local value.

The total area $S_t$ of the electrochemical cell 1 is furthermore defined by a peripheral fastening zone Zf in which is located an adhesive material 2 placed between the holding plates 20, allowing the holding plates 20 to be fastened to each other. Thus, it is not necessary to employ end plates to apply a force that clamps the holding plates 20 to each other. The electrochemical cell 1 thus has an improved compactness and therefore a better energy density per unit mass and per unit volume.

The peripheral fastening zone Zf extends longitudinally around the membrane electrode assembly 10, in an XY plane parallel to the plane of the electrolytic membrane 11. More precisely, in this example, for each holding plate 20, a strip of adhesive material 2 extends longitudinally through the fastening zone Zf and makes contact with the insulating substrate 21 and with the electrolytic membrane 11. The transverse dimension (width) $d_f$ of the fastening zone Zf in the XY-plane, here corresponding to the width of the strip of adhesive material 2, is predetermined and depends on the mechanical strength desired for the electrochemical cell (which notably depends on the properties of the adhesive material used). The width $d_f$ is defined as being the distance between a border of the membrane electrode assembly 10, and more precisely a border of an electrode 12, 13, and a border of the holding plate 20, along the X-axis of the length $L_a$ or along the Y-axis of the width $l_a$.

Thus, by virtue of the adhesive material 2, the holding plates 20 are fastened to each other in the fastening zone Zf and are therefore not liable to deform along the Z-axis during the operation of the electrochemical cell, in particular as a result of the pressure of the fluids flowing through the distribution channels 22.

FIG. 2A is a schematic top view of a holding plate 20. The active zone Za is shown hatched and has a shape that is elongate ($L_a > l_a$), here a rectangular shape. As mentioned above, it is continuously bordered by the fastening zone Zf, which has a constant width $d_f$ over the longitudinal extent of the fastening zone Zf. Thus, the total area St of the electrochemical cell 1 is formed from the sum of the area $S_a$ of the active zone Za and of the area $S_f$ of the fastening zone Zf. It here has a rectangular shape of length $L_t$ and of width $l_t$.

Now, for an electrochemical performance of given level there is a need to limit the mass of an electrochemical cell 1, in order thus to improve its power density per unit mass. To do this, one approach here consists in minimizing the total area St of the electrochemical cell 1 for a predetermined active area $S_a$ corresponding to an electrical current I imposed on the electrochemical cell 1, and for a predetermined fastening dimension $d_f$ allowing the desired mechanical strength to be ensured.

It is thus sought to determine a first cost function F expressing the variation in a parameter $\tilde{S}_t$, representative of the total area St of the electrochemical cell, as a function of an adjustment variable $\tilde{R}_f$, here equal to $S_a/L_a^2$, representative of the aspect ratio of elongation of the active zone Za. Thus, a first criterion consists in optimizing the cost function F associated with the mass of the electrochemical cell, i.e. in minimizing the total area St, while taking into account a second criterion, described below, associated with the performance of the electrochemical cell.

To do this, the total area $S_t$ is first expressed as a function of the length $L_a$ of the active zone Za by the following relationship, here in the particular case of an active zone of rectangular shape:

$$S_t = f_1(L_a) = (L_a + 2l_c)\left(\frac{S_a}{L_a} + 2L_c\right)$$

where the parameter $S_t$ is to be minimized, the length $L_a$ being an adjustment variable, the area $S_a$ of the active zone Za and the width $d_f$ of the fastening zone Zf being predetermined.

Figure 2B:
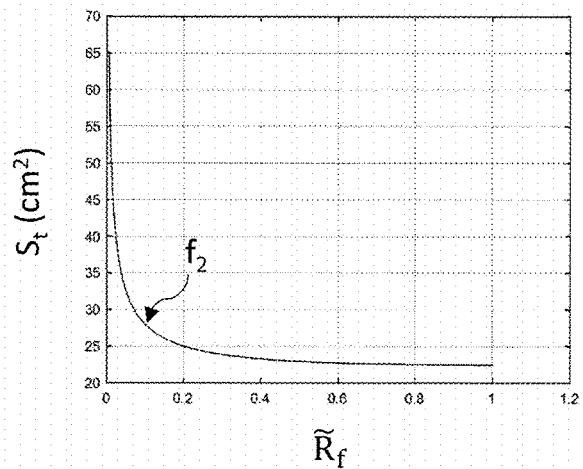
FIG. 2B is a graph illustrating one example of the variation in the total area $S_t$ as a function of an adjustment variable $\tilde{R}_f$ representative of the aspect ratio of elongation of the active zone.

As illustrated in FIG. 2B, a change of variable is then carried out so that the adjustment variable is the normalized variable $\tilde{R}_f$, i.e. an adimensional variable that varies between 0 and 1 (exclusive of limits), and that is representative of the aspect ratio of elongation of the active zone Za. Thus, the function expressing the relationship between the total area $S_t$ and the normalized adjustment variable $\tilde{R}_f$ is denoted $f_2$:

$$S_t = f_2(\tilde{R}_f)$$

the total area $S_t$ tending towards a minimum value $(S_t)_{min}$ when $\tilde{R}_f$ tends toward 1, i.e. for an active zone Za of substantially square shape, and tending towards infinity when $\tilde{R}_f$ tends towards 0, i.e. for an active zone Za of very elongate shape. In this example, for an active area $S_a$ of 14 cm² and a fastening width $d_f$ of 0.5 cm, the minimum value $(S_t)_{min}$ is equal to 22.5 cm² for a substantially square shape of 3.75 cm side length ($\tilde{R}_f \to 1$).

Figure 2C:
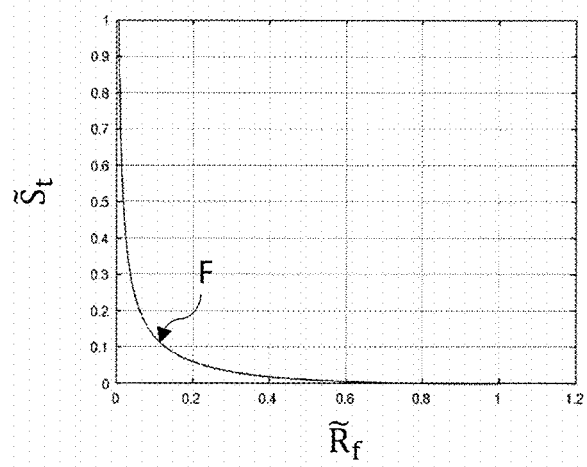
FIG. 2C is a graph illustrating one example of the variation in a normalized parameter $\tilde{S}_t$ representative of the total area $S_t$ as a function of the adjustment variable $\tilde{R}_f$.

As illustrated in FIG. 2C, the total area $S_t$ is then normalized to obtain a normalized parameter $\tilde{S}_t$, i.e. an adimensional parameter varying between 0 and 1 representative of the total area $S_t$ of the electrochemical cell. The relationship is thus written:

$$\tilde{S}_t = F(\tilde{R}_f)$$

where the parameter $\tilde{S}_t$ tends toward 0 when $\tilde{R}_f$ tends towards 1 (this corresponding to the minimum value $(S_t)_{min}$ for a substantially square shape), and where the parameter $\tilde{S}_t$ tends toward 1 when $\tilde{R}_f$ tends toward zero (very elongate shape).

Thus, a first cost function F expressing the variation in a normalized parameter $\tilde{S}_t$ representative of the total area $S_t$ as a function of the normalized adjustment variable $\tilde{R}_f$ representative of the aspect ratio of elongation of the active zone Za is obtained. This function therefore comprises only one adjustment variable, namely $\tilde{R}_f$ which is adimensional and varies between 0 and 1, and comprises two predetermined parameters, namely the area $S_a$ of the active zone Za and the width $d_f$ of the fastening zone Zf.

This cost function F is a monotonically decreasing function that expresses the fact that a substantially square shape ($\tilde{R}_f \to 1$) tends to minimize the total area St, and therefore to limit the total mass of the electrochemical cell for an electrochemical performance of given level (the area $S_a$ of the active zone Za being predetermined), while allowing for mechanical constraints related to the need to fasten the holding plates to each other (the width $d_f$ of the fastening zone Zf being predetermined). The normalized parameter $\tilde{S}_t$ is here chosen so that the optimization of the cost function F is a minimization of the latter. Equivalently, it may be chosen so that the optimization of the cost function F is a maximization thereof.

Figure 3A:
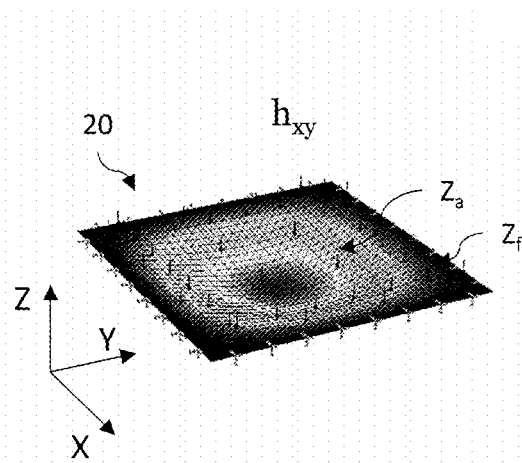
FIGS. 3A and 3B are perspective views of two simplified holding plates having different aspect ratios and undergoing a different local deformation as a result of the same uniformly applied pressure.
Figure 3B:
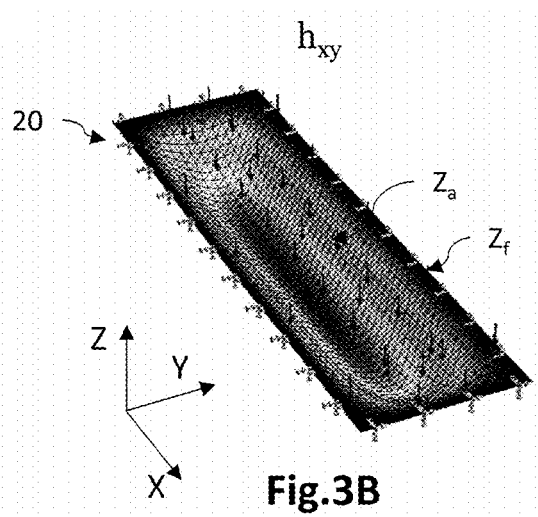

FIGS. 3A and 3B illustrate, for various values of the normalized adjustment variable $\tilde{R}_f$, two examples of a simplified holding plate 20 having a spatial distribution of a bow $h_{xy}$ along the Z-axis, the bow being oriented away from the membrane electrode assembly 10. The local bow $h_{xy}$ is defined as the local difference in the position of a point on the internal face 21.1 of the deformed holding plate 20, with respect to its rest position (i.e. a zero deformation).

The spatial distribution of the bow $h_{xy}$ of the deformed holding plate 20 is obtained by simulating the mechanical behaviour of the holding plate with a finite-element simulation software package, here the software package Solid-Works Simulation. The holding plate 20 is here a simplified substrate taking the form of a plate comprising no distribution channels. A peripheral zone of the holding plate is held stationary and corresponds to the fastening zone Zf. A central zone bounded by this peripheral zone, corresponding to the active zone Za, is free to be deformed along the Z-axis because of the application of a uniform pressure of 1 bar. The holding plate 20 has a thickness of 1.6 mm and is made from a material equivalent to the material FR4 (fibreglass-reinforced epoxy resin) in that its Young's modulus is equal to 24 kN/mm² and its Poisson's ratio is equal to 0.136.

As FIGS. 3A and 3B illustrate, the application of a uniform pressure of 1-bar value to the holding plate 20 causes a local deformation thereof in the active zone Za, the maximum value $(h_{xy})_{max}$ of the local bow $h_{xy}$ of which depends on the aspect ratio of elongation of the active zone Za. Thus, FIG. 3A shows that a holding plate 20 of substantially square shape ($\tilde{R}_f \to 1$) undergoing a pressure of 1 bar has a maximum bow $(h_{xy})_{max}$ of 30 µm, i.e. here about 1.87% of its thickness. In addition, FIG. 3B shows that, for the same pressure, a holding plate 20 of elongate shape $\tilde{R}_f = 0.5$ ($L_a = 2. 1_a$) has a maximum bow $(h_{xy})_{max}$ of 5 µm, i.e. here about 0.31% of its thickness. Lastly, for the same pressure, a holding plate of very elongate shape of $\tilde{R}_f = 0.07$ ($L_a = 14. 1_a$) has a maximum bow $(h_{xy})_{max}$ of 0.3 µm, here about 0.02% of its thickness.

It will be clear from the above that the pressure of the fluid flowing through the distribution channels may result in a local deformation of the holding plate 20 in a Z-direction away from the membrane electrode assembly 10, the maximum value $(h_{xy})_{max}$ of the local bow $h_{xy}$ of which depends directly on the aspect ratio of the active zone Za. Thus, the maximum bow $(h_{xy})_{max}$ of the active zone Za may have a ratio 100 depending on whether the shape is substantially square ($\tilde{R}_f \to 1$) or is very elongate ($\tilde{R}_f = 0.07$). However, as mentioned above, the quality of the mechanical contact between the holding plate 20 and the electrode 12, 13 has a direct influence on the value of the electrical contact resistance Rc. A poor mechanical contact related to a substantial bow $(h_{xy})_{max}$ results in a local increase in the electrical contact resistance Rc and therefore in a decrease in the performance of the electrochemical cell, notably via a decrease in the voltage U generated by the electrochemical cell 1 for an imposed value of the electrical current I.

There is therefore a need to optimize the electrochemical performance of the electrochemical cell 1, and thus to maximize an electrical signal generated by the electrochemical cell in operation, here the voltage U, for a predetermined area $S_a$ of the active zone Za.

Figure 3C:
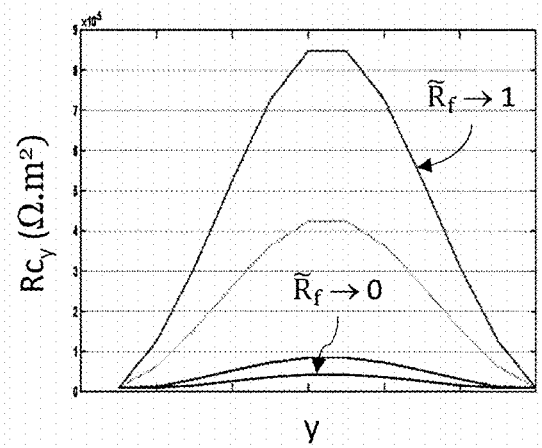
FIG. 3C is a graph illustrating the variation in an electrical contact resistance $Rc_y$ across a width of a holding plate, for various aspect ratios.

It is thus sought to determine a second cost function G that expresses the variation of a parameter $\tilde{P}_U$ representative of the electrical signal, here the voltage U, generated by the electrochemical cell 1 in operation, and that is a function of the normalized adjustment variable $\tilde{R}_f$, here equal to $S_a/L_a^2$, representative of the aspect ratio of elongation of the active zone Za. As mentioned above, a second criterion consists in optimizing the cost function G associated with the electrochemical performance of the electrochemical cell, i.e. in maximizing the voltage U, while taking into account the first criterion, described above, associated with the minimization of the mass of the electrochemical cell As illustrated in FIG. 3C, it is possible firstly to determine the spatial distribution $Rc_{xy}$ of the electrical contact resistance Rc from the spatial distribution of the bow $h_{xy}$ determined beforehand (FIGS. 3A and 3B for example). FIG. 3C thus illustrates the transverse distribution $Rc_y$ of the electrical contact resistance Rc along the Y-axis of the width $l_a$, in a cross-sectional plane positioned at $X=L_a/2$, for various values of the aspect ratio of the active zone Za, and therefore of the normalized adjustment variable $\tilde{R}_f$.

It is thus possible to deduce the maximum local value $(Rc_{xy})_{max}$ of the electrical contact resistance. By way of example, for an electrochemical cell the holding plate 20 of which undergoes no deformation related to the pressure of the fluid flowing through the distribution channels, and therefore for an $\tilde{R}_f$ that tends toward 0 (very elongate shape), the electrical contact resistance Rc may have a uniform reference value $(Rc)_{ref}$ equal to $8.7\times10^{-7}$ $\Omega\cdot m^2$ (here for $\tilde{R}_f=0.07$). The electrical contact resistance Rc has a maximum local value $(Rc_{xy})_{max}$ that increases as the aspect ratio tends towards a square, i.e. as $\tilde{R}_f$ tends toward 1. When $\tilde{R}_f$ tends towards 1 (substantially square shape), Rc has a maximum local value equal to $8.7\times10^{-5}$ $\Omega\cdot m^2$ (here for $\tilde{R}_f\sim 1$), i.e. 100 times higher than the reference value $(Rc)_{ref}$.

Figure 3D:
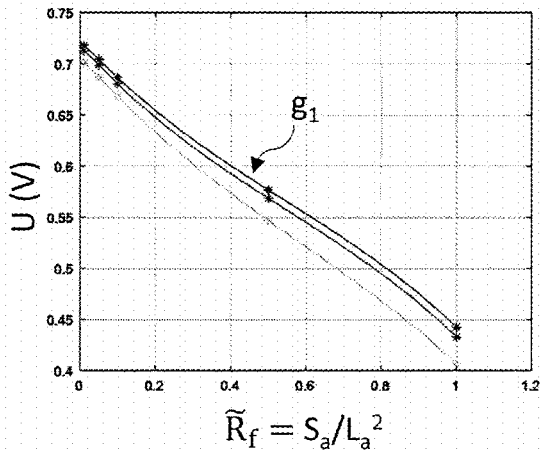
FIG. 3D is a graph illustrating an example of the variation in the electric voltage U as a function of the adjustment variable $\tilde{R}_f$.

As illustrated in FIG. 3D, on the basis of the spatial distribution $Rc_{xy}$ of the electrical contact resistance Rc determined beforehand for various values of the normalized adjustment variable $\tilde{R}_f$, the value of the voltage U generated by the electrochemical cell is then expressed for each spatial distribution $Rc_{xy}$ of the electrical contact resistance Rc, and therefore for each value of the normalized adjustment variable $\tilde{R}_f$. To do this, a physical model of the electrochemical response of the electrochemical cell, here of the voltage U, is used, for predetermined physicochemical properties and under predetermined electrochemical-cell operating conditions. This model may be the dynamic model of Robin et al 2015 described in the publication entitled *Development and experimental validation of a PEM fuel cell 2D-model to study heterogeneities effects along large-area cell surface*, Int. J. Hydrogen Energy, 40 (2015)10211-10230. Other physical models may be used. Thus the following relationship is obtained:

$$U=g_1(\tilde{R}_f)$$

where the function $g_1$ is a continuous function for example resulting from an interpolation carried out using the obtained values of the voltage U as a function of the normalized adjustment variable $\tilde{R}_f$. Various values of the voltage U are shown here, for various electrochemical-cell electrochemical-performance levels (various U/I electrochemical-cell bias curves).

Next, the voltage U is normalized in order to obtain a normalized parameter $\tilde{U}$, which is therefore adimensional and varies between 0 and 1, representative of the voltage U generated by the electrochemical cell in operation.

Figure 3E:
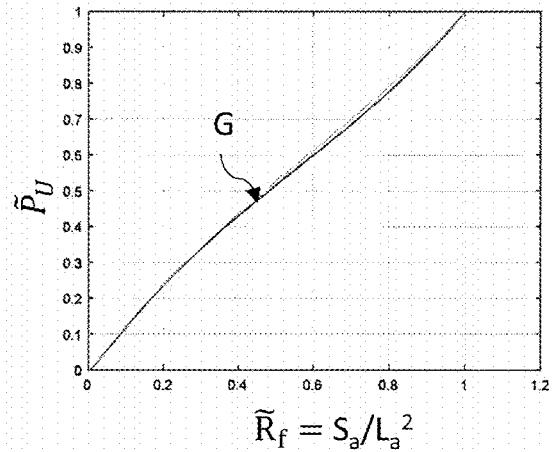
FIG. 3E is a graph illustrating an example of the variation in a normalized parameter $\tilde{P}_U$ representative of the voltage U as a function of the adjustment variable $\tilde{R}_f$.

As illustrated in FIG. 3E, preferably, a change of variable is also carried out in order to pass from the normalized parameter $\tilde{U}$ to a new parameter $\tilde{P}_U=1-\tilde{U}$. Thus, the relationship is written:

$$\tilde{P}_U=G(\tilde{R}_f)$$

where the parameter $\tilde{P}_U$ is substantially equal to 0 when $\tilde{R}_f\to 0$, this corresponding to the maximum value of the voltage U (very elongate shape, therefore low $(h_{xy})_{max}$ and low $(Rc_{xy})_{max}$), and where the parameter $\tilde{P}_U$ is substantially equal to 1 when $\tilde{R}_f\to 1$, this corresponding to the minimum value of the voltage U (substantially square shape, therefore high $(h_{xy})_{max}$ and high $(Rc_{xy})_{max}$).

Thus, a second cost function G expressing the variation in a normalized parameter $\tilde{P}_U$ representative of the voltage U produced by the electrochemical cell as a function of the normalized adjustment variable $\tilde{R}_f$ representative of the aspect ratio of elongation of the active zone Za is obtained. This function therefore comprises only one adjustment variable, namely $\tilde{R}_f$, which is adimensional and varies between 0 and 1 (exclusive of limits), and comprises two predetermined parameters, namely the area $S_a$ of the active zone Za and the width $d_f$ of the fastening zone Zf. It also depends on the physicochemical properties and on the operating conditions defined in the physical model used.

This cost function G is here a monotonically increasing function that expresses the fact that a very elongate shape ($\tilde{R}_f\to 0$) tends to maximize the voltage U, and therefore to maximize the electrochemical performance of the electrochemical cell. The normalized parameter $\tilde{P}_U$ has here been chosen so that the optimization of the cost function G is a minimization of the latter. Equivalently, it may be chosen so that the optimization of the cost function G is a maximization thereof.

It is next sought to optimize a compound cost function formed from the first cost function F and from the second cost function G. The identification of a value $(\tilde{R}_f)_{opt}$ of the adjustment variable $\tilde{R}_f$ optimizing the compound cost function then allows the first and second cost functions F and G to be conjointly optimized, and thus the total area $S_t$ of the electrochemical cell to be minimized while maximizing the electrical signal, here the voltage U, generated by the electrochemical cell 1.

Figure 4A:
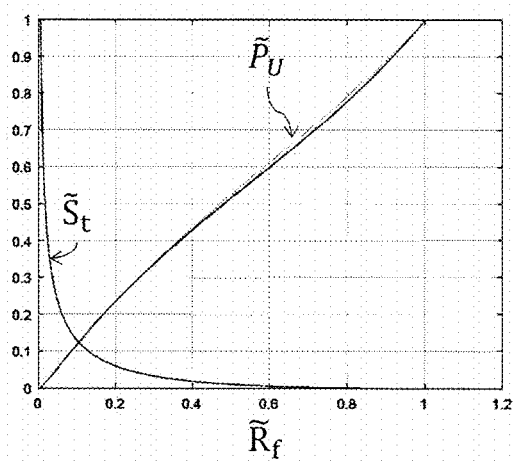
FIG. 4A is a graph illustrating an example of the variation in the normalized parameters $\tilde{S}_t$ and $\tilde{P}_U$ as a function of the adjustment variable $\tilde{R}_f$.

As illustrated in FIG. 4A, in so far as the parameter $\tilde{S}_t$ and the parameter $\tilde{P}_U$ are normalized and both depend on the same normalized adjustment variable $\tilde{R}_f$, it is possible to draw the two cost functions F and G on the same graph. The cost function F is a decreasing function and tends to be optimized when the adjustment variable $\tilde{R}_f$ tends to 1, thus minimizing the total area $S_t$. The cost function G is an increasing function and tends to be optimized when the adjustment variable $\tilde{R}_f$ tends to 0, thus maximizing the voltage U. Using the multi-criteria optimization approach, the value $(\tilde{R}_f)_{opt}$ of the adjustment variable $\tilde{R}_f$ that optimizes the compound cost function, and that therefore optimizes both the cost function F and the cost function G, is comprised between $\tilde{R}_f=0$ and $\tilde{R}_f=1$, excluding these values. The fact that one of the cost functions F and G is an increasing function and the other a decreasing function makes it possible to easily determine the compound cost function that needs to be optimized, i.e. to be minimized or maximized.

Figure 4B:
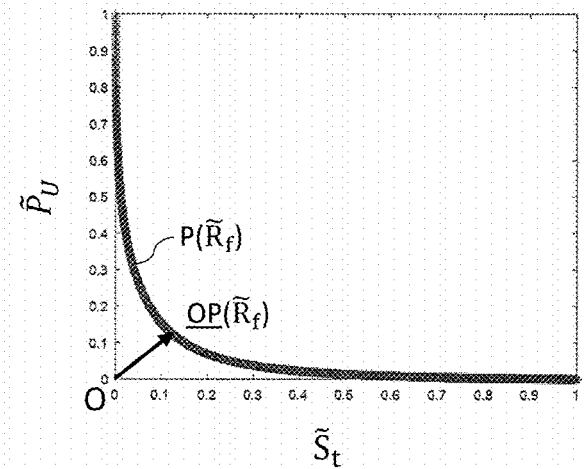
FIG. 4B is a graph illustrating an example of the variation in the normalized parameter $\tilde{P}_U$ as a function of the normalized parameter $\tilde{S}_t$.

As illustrated in FIG. 4B, according to a first variant, the second parameter $\tilde{P}_U=G(\tilde{R}_f)$ is expressed as a function of the first parameter $\tilde{S}_t=F(\tilde{R}_f)$. In other words, a Pareto front is drawn in the space of the solutions of the cost functions F and G. Each point $P(\tilde{R}_f)$ of the graph depends on the value of the adjustment variable $\tilde{R}_f$, and its coordinates are the corresponding values of the parameter $\tilde{P}_U$ and of the parameter $\tilde{S}_t$. Next, a norm $d_{Rf}$ is calculated for each vector $OP(\tilde{R}_f)$ where O is the reference point of the coordinate system (O, $\tilde{S}_t$, $\tilde{P}_U$). The norm $d_{Rf}$ may thus be the Euclidean distance between the point P in question and the point O. Thus, a compound cost function $C_v$ expressing the variation in the norm $d_{Rf}$ as a function of the adjustment variable $\tilde{R}_f$ is obtained, expressed thus:

$$d_{Rf}=C_V(\tilde{R}_f).$$

The optimization of the compound cost function $C_v$ amounts to identifying that value $(\tilde{R}_f)_{opt}$ of the adjustment variable $\tilde{R}_f$ for which the norm $d_{Rf}$ is minimum. In other words: $d_{Rf}((\tilde{R}_f)_{opt})=\min(d_{Rf})$. Thus, at the value $(\tilde{R}_f)_{opt}$ the cost function F and the cost function G are conjointly optimized, i.e. the total area $S_t$ is minimized while the electric signal U generated by the electrochemical cell is maximized.

Figure 4C:
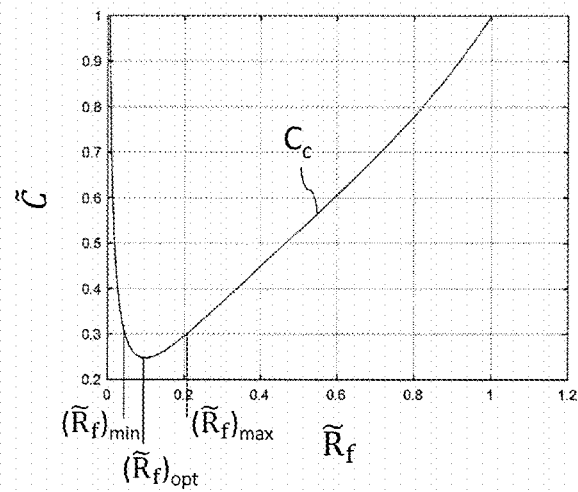
FIG. 4C is a graph illustrating a compound cost function $C_c$ that is a linear combination of cost functions F and G such that $\tilde{S}_t = F(\tilde{R}_f)$ and $\tilde{P}_U = G(\tilde{R}_f)$.

As illustrated in FIG. 4C, according to a second variant, a compound cost function $C_c$ is defined to be a combination, for example a linear combination, of the cost functions F and G. In other words:

$$\tilde{C}(\tilde{R}_f)=C_c(\tilde{R}_f)=\alpha\cdot F(\tilde{R}_f)+\beta\cdot G(\tilde{R}_f).$$

where the parameter $\tilde{C}$ is a normalized parameter, and where the coefficients $\alpha$ and $\beta$ are weighting coefficients, here equal to 1, which may be adapted depending on the weight attributed to such a criterion with respect to the other criterion.

Thus, a curve that tends toward 1 when $\tilde{R}_f\to 0$ is obtained, this corresponding to a very elongate shape that thus optimizes the cost function G and therefore maximizes the voltage U. The compound cost function $C_c$ then passes through an extremum of the value $(\tilde{R}_f)_{opt}$, then tends towards 1 when $\tilde{R}_f\to 1$, this corresponding to a substantially square shape thus optimizing the cost function F and therefore minimizing the total area $S_t$. The optimization of the compound cost function $C_c$ therefore consists in identifying the value $(\tilde{R}_f)_{opt}$ of the adjustment variable $\tilde{R}_f$ for which the cost function $C_c$ has an extremum, here a minimum: $C_c((\tilde{R}_f)_{opt})=\min(C_c(\tilde{R}_f))$. Thus, at the value $(\tilde{R}_f)_{opt}$ the cost function F and the cost function G are conjointly optimized, i.e. the total area $S_t$ is minimized while the electric signal U generated by the electrochemical cell is maximized.

By way of example, for an active zone Za the area $S_a$ of which is 14 cm² and for a fastening zone Zf the dimension $d_f$ of which is 0.5 cm, the value $(\tilde{R}_f)_{opt}$ of 0.10 gives a length of $L_a$ 11.7 cm, leading to a total area of $S_t$ 27.9 cm² and a voltage of 0.6 V. Specifically, it is a question of a value optimizing both the total area $S_t$ and the voltage U in so far as it is a question of a compromise between a substantially square shape minimizing the total area ($S_t=22.5$ cm²) but having a degraded voltage (U=0.48 V), and a very elongate shape maximizing the voltage (U~0.7 V) but having a high total area ($S_t=32$ cm² for $\tilde{R}_f=0.1$).

Thus, the method for determining the dimensions of the electrochemical cell indeed allows an optimum value of the aspect ratio of the elongate active zone $Z_a$, i.e. a value for which the electrochemical cell has conjointly not only a limited mass and therefore a better energy density per unit mass but also a good electrochemical performance, to be identified.

A process for manufacturing the electrochemical cell thus comprises a phase of identifying the value $(\tilde{R}_f)_{opt}$ of the adjustment variable $\tilde{R}_f$ for which the total area $S_t$ and the electrochemical performance are conjointly optimized, then manufacturing the electrochemical cell depending on the identified value $(\tilde{R}_f)_{opt}$. The active zone Za may thus have the identified value $(\tilde{R}_f)_{opt}$ or as a variant have a value $\tilde{R}_f$ comprised between a range extending from $(\tilde{R}_f)_{min}$ to $(\tilde{R}_f)_{max}$. As illustrated in the FIG. 4C, this range may be defined so that the compound cost function $C_c$ or $C_v$ deviates by an amount less than or equal to a preset percentage, for example 20%, and preferably 10%, from the optimum corresponding to the identified value $(\tilde{R}_f)_{opt}$ of the adjustment variable $\tilde{R}_f$.

Particular embodiments have just been described. Various variants and modifications will appear obvious to those skilled in the art Thus, it is possible to identify the value $(\tilde{R}_f)_{opt}$ of the adjustment variable $\tilde{R}_f$ that optimizes the compound cost function $C_c$; $C_v$ under various operating conditions of a given operating electrochemical cell, as described above, and then to select one value, among the various identified optimal values $(\tilde{R}_f)_{opt}$, depending on a predetermined target value for the total area $S_t$ and/or a predetermined target value for the generated electrical signal, here the voltage U. This amounts to carrying out certain steps of the method for various bias curves of a given operating electrochemical cell, these curves being representative of various operating conditions applied to the electrochemical cell, such as, for example, temperature, the flow rates of the fluids, etc. A bias curve expresses the variation in the voltage U as a function of the current density i of the electrochemical cell. Such a curve is thus dependent on the intrinsic physicochemical characteristics of the electrochemical cell and on the operating conditions.

To do this, the method comprises iterative or simultaneous implementation of the following steps:
 a. determining the first cost function F that expresses the variation in the first parameter $\tilde{S}_t$ representative of the total area $S_t$ as a function of the adjustment variable $\tilde{R}_f$;
 b. determining, from the computer-implemented predetermined physical model of the electrochemical cell 1, the second cost function G that expresses the variation in the second parameter $\tilde{P}_U$ representative of the generated electrical signal, here the voltage U, as a function of the adjustment variable $\tilde{R}_f$;
 c. determining a so-called compound cost function $C_c$; $C_v$ from the first and second cost functions F, G and identifying a value $(\tilde{R}_f)_{opt}$ of the adjustment variable $\tilde{R}_f$ that optimizes the compound cost function $C_c$; $C_v$ and that therefore conjointly optimizes the first and second cost functions F, G.

During each implementation of steps a to c, the physical model furnishes a different variation in the generated electrical signal, which variation is dependent on the operating conditions, the latter being different from one implementation of the steps to the next. It may thus be a question of varying the inlet temperature of a heat-transfer fluid of the electrochemical cell, of varying the flow rates of the fluid reactants, or of varying any other parameter applied to the electrochemical cell in operation. Preferably, the various variations in the electrical signal U generated by the electrochemical cell correspond to the same electrical signal imposed on the electrochemical cell, here the same value of the current density i.

Thus, following the various steps c, a plurality of optimal values $(\tilde{R}_f)_{opt}$ of the adjustment variable $\tilde{R}_f$ are identified, which values are associated with various operating conditions of the electrochemical cell in operation, preferably for a given current density imposed on the electrochemical cell. The method then comprises a step d of selecting a value for the adjustment variable $\tilde{R}_f$, among said identified optimal values $(\tilde{R}_f)_{op}$. This selecting step notably takes into account a predetermined target value of the total area $S_t$ and/or a predetermined target value of the electrical signal generated by the cell in operation. Thus, the method then allows the value of the adjustment variable $R_f$ that optimizes both the total area $S_t$ and the electrical power furnished by the electrochemical cell in operation to be adapted, here for a given value of the imposed current density i, by adapting the operating conditions applied to the electrochemical cell in operation.

The invention claimed is:

1. A computer-implemented method for determining the dimensions of an electrochemical cell, the method minimizing a total area of the electrochemical cell while maximizing an electrical signal generated by the electrochemical cell in operation, the electrochemical cell comprising:
   a membrane electrode assembly formed from two electrodes separated from each other by an electrolytic membrane, and two holding plates between which the membrane electrode assembly is held in contact;
   the total area of the electrochemical cell being defined in a plane parallel to plane of the electrolytic membrane by:
   (1) an active zone of elongated shape having an aspect ratio defined by a length and a width, the length being larger than the width, wherein in the active zone each holding plate is liable to be deformed in a direction opposite to the plane of the electrolytic membrane, and
   (2) a fastening zone encircling the active zone, wherein in the fastening zone each holding plate is fastened to the membrane electrode assembly;
   the method comprising the following steps:
   (a) determining a first cost function expressing a variation in a first parameter representative of the total area as a function of an adjustment variable representative of said aspect ratio of the active zone;
   (b) determining, from a predetermined physical model of the electrochemical cell implemented in the computer, a second cost function expressing the variation in a second parameter representative of the generated electrical signal as a function of the adjustment variable; and
   (c) determining a compound cost function from the first and second cost functions and identifying a value of the adjustment variable that optimizes the compound cost function thereby conjointly optimizing the first and second cost functions.

2. The method according to claim 1, wherein the predetermined physical model furnishes a variation, under given operating conditions, in said generated electrical signal as a function of an electrical resistance the value of which depends on a local deformation of a holding plate in the active zone, said local deformation itself being dependent on the adjustment variable.

3. The method according to claim 2, comprising:
   determining a plurality of optimal values of the adjustment variable by repeating steps (a) to (c) plural times so that, in each implementation, the predetermined physical model furnishes a different variation of plural variations in said generated electrical signal, said variations in said generated electrical signal corresponding to various operating conditions of the electrochemical cell in operation;
   (d) selecting one of said plurality of optimal values depending on a predetermined target value for the total area and/or on a predetermined target value for the generated electrical signal.

4. The method according to claim 3, during the repeating of steps (a) to (c), said variations in said generated electrical signal correspond to a given value of an electrical signal imposed on the electrochemical cell in operation.

5. The method according to claim 1, wherein the first parameter, the second parameter and the adjustment variable are normalized.

6. The method according to claim 5, wherein the first cost function tends to be optimized when the adjustment variable tends to 1 or 0, respectively, and the second cost function tends to be optimized when the adjustment variable tends to 0 or 1, respectively.

7. The method according to claim 1, wherein the first parameter is chosen so that the first cost function is a decreasing or increasing function, respectively, and the second parameter is chosen so that the second cost function is an increasing or decreasing function, respectively.

8. The method according to claim 1, wherein the first parameter is chosen so that a minimization or maximization, respectively, of the first cost function tends to minimize the total area, and the second parameter is chosen so that a minimization or maximization, respectively, of the second cost function tends to maximize the electrical signal.

9. The method according to claim 1, wherein the compound cost function is a norm of a vector formed, for each value of the adjustment variable, from the corresponding values of the first parameter and of the second parameter, the identified value of the adjustment variable corresponding to an extremum of the compound cost function.

10. The method according to claim 1, wherein the compound cost function is a linear combination of the first cost function and the second cost function, the identified value of the adjustment variable corresponding to an extremum of the compound cost function.

11. A manufacturing process for manufacturing an electrochemical cell, comprising the following steps:
    determining the dimensions of an electrochemical cell using the method according to claim 1;
    manufacturing the electrochemical cell so that the aspect ratio of the active zone is a function of the identified value of the adjustment variable.

12. The manufacturing process according to claim 11, wherein the aspect ratio of the active zone is chosen in a range of the adjustment variable for which the compound cost function has a deviation smaller than or equal to a predetermined percentage from the extremum corresponding to the identified value of the adjustment variable.

13. A data storage medium comprising computer instructions for executing the determining method according to claim 1.

14. A device for determining the dimensions of an electrochemical cell comprising:
    a computer, comprising a processor and a memory, configured to implement the determining method according to claim 1;
    means for inputting data in order to furnish the computer with a value for the area of the active zone and a value for the dimension of the fastening zone;
    means for outputting at least one identified value of the adjustment variable.

15. The method according to claim 1, wherein the compound cost function is a combination of the first cost function and the second cost function, the identified value of the adjustment variable corresponding to an extremum of the compound cost function.

\* \* \* \* \*